United States Patent
Chang (10) Patent No.: US 7,794,098 B2
(45) Date of Patent: Sep. 14, 2010

(54) LIGHT-EMITTING DIODE LIGHT SOURCE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 920 days.

(21) Appl. No.: 11/620,881

(22) Filed: Jan. 8, 2007

(65) Prior Publication Data

US 2008/0088570 A1    Apr. 17, 2008

(30) Foreign Application Priority Data

Oct. 17, 2006    (CN) ................. 2006 1 0201008

(51) Int. Cl.
*F21V 9/00* (2006.01)

(52) U.S. Cl. ................. 362/97.3; 362/231; 362/249.02; 362/612

(58) Field of Classification Search ................. 362/97.3, 362/231, 800, 249.02, 612, 631, 230, 330, 362/97.1, 97.2, 249.03–249.06

See application file for complete search history.

(56) References Cited

U.S. PATENT DOCUMENTS

| | | | | |
|---|---|---|---|---|
| 7,140,751 B2 * | 11/2006 | Lin | ................. | 362/249.02 |
| 7,316,486 B2 * | 1/2008 | Klettke | ................. | 362/231 |
| 7,520,637 B2 * | 4/2009 | Jeong et al. | ................. | 362/294 |
| 7,553,046 B2 * | 6/2009 | Noh et al. | ................. | 362/249.16 |
| 7,588,362 B2 * | 9/2009 | Park et al. | ................. | 362/612 |
| 7,637,626 B2 * | 12/2009 | Park et al. | ................. | 362/97.3 |
| 2005/0207165 A1 * | 9/2005 | Shimizu et al. | ................. | 362/362 |
| 2007/0030674 A1 * | 2/2007 | Kim et al. | ................. | 362/231 |
| 2007/0153515 A1 * | 7/2007 | Hong et al. | ................. | 362/237 |

* cited by examiner

*Primary Examiner*—Bao Q Truong
(74) *Attorney, Agent, or Firm*—Jeffrey T. Knapp (57) ABSTRACT

An exemplary LED light source (20) includes plural LED modules (201). Each LED module includes three circuit boards (202), (203), and (204) arranged in parallel, and plural light-mixing units (206). Each light-mixing unit has two first color LEDs (2061), a second color LED (2062), and a third color LED (2063). The first, second, and third color LEDs of each light-mixing unit are distributed on the three circuit boards in a predetermined arrangement.

15 Claims, 7 Drawing Sheets

LIGHT-EMITTING DIODE LIGHT SOURCE AND BACKLIGHT MODULE USING THE SAME

BACKGROUND OF THE INVENTION

1. Field of the Invention

The present invention relates to a light-emitting diode (LED) light source and a backlight module using the LED light source, the backlight module typically employed in a liquid crystal display.

2. Discussion of the Related Art

In a liquid crystal display device, liquid crystal is a substance that does not itself generate light. Instead, the liquid crystal relies on light received from a light source in order to provide light to display images and data. In the case of a typical liquid crystal display device, a backlight module powered electrically supplies the needed light.

Typically, a light source employed in a backlight module is one or more cold cathode fluorescence lamps (CCFLs) or one or more light-emitting diodes (LEDs).

LEDs are semiconductors that convert electrical energy into light. Compared to CCFLs, LEDs generate less heat, and have a higher energy conversion efficiency, higher radiance (that is, they emit a larger quantity of light per unit area), longer service lifetime, higher response speed, and better reliability.

It is known that white light is a mixture of different wavelengths across the visible light spectrum. Traditional LEDs cannot produce white light. Instead, each LED can only produce light in one very narrow frequency band. Generally, a combination of light in three primary colors, i.e. a mixture of red, green, and blue light, produces white light. In fact, any color of light may be produced with an appropriate combination of these three colors of light. By combining red, green, and blue LEDs in a tightly packed pattern, an impure form of white light is produced.

Figure 7:
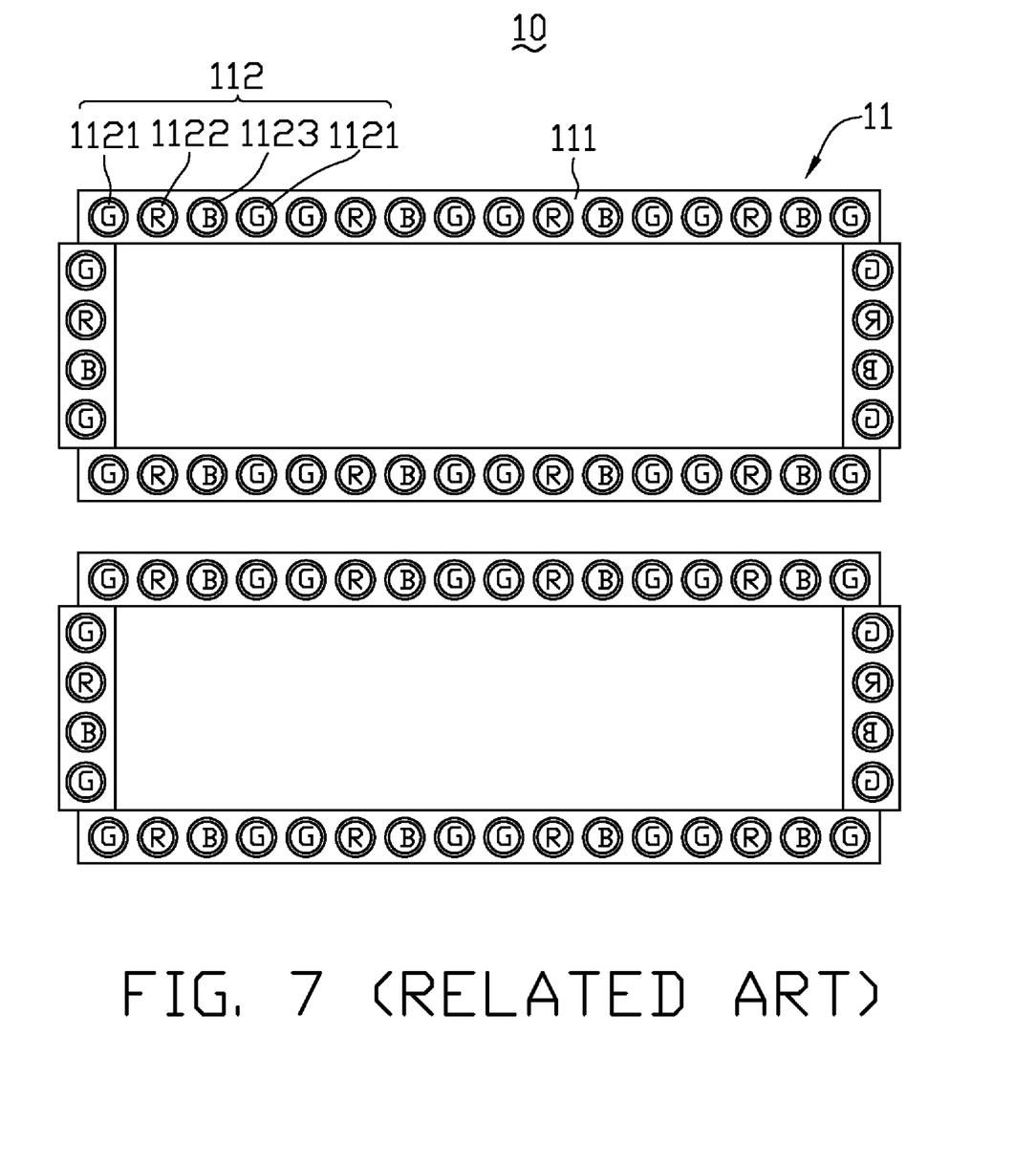
FIG. 7 is a top plan view of a conventional LED light source of a backlight module.

Referring to FIG. 7, a typical LED light source of a backlight module is shown. The LED light source 10 includes a plurality of LED modules 11. Each LED module 11 includes a plurality of circuit boards 111, and a plurality of white light units 112 located on the circuit boards 111. Each white light unit 112 includes two green LEDs 1121, a red LED 1122, and a blue LED 1123. From left to right or from top to bottom, one of the green LEDs 1121, the red LED 1122, the blue LED 1123, and the other green LED 1121 of each of the white light units 112 are arranged in a line in that order.

In the LED light source 1 0, heat generated by each of the white light units 112 is small. However, in order to obtain a higher intensity light emission from the LED light source 10, each LED module 11 should include a plurality of white light units 112. Because the green LEDs 1121, the red LED 1122, the blue LED 1123 of the white units 112 are arranged in the lines, too much heat is easily generated in a localized area of the LED light source 10, which can be difficult to dissipate. As a result, overheating in the localized area of the LED light source 10 may occur. In addition, the alternating ordering of the green LEDs 1121, the red LED 1122, and the blue LED 1123 may cause difficulties in assembly of the LED modules 11.

Therefore, what is needed is a new LED light source and a backlight module using the LED light source which can overcome the above-described shortcomings.

SUMMARY

In one aspect, a LED light source includes at least one LED module. Each LED module includes at least three circuit boards in parallel, and a plurality of light-mixing units. Each light-mixing unit has two first color LEDs, a second color LED, and a third color LED. The first, second, and third color LEDs of each light-emitting diode unit are distributed on the at least three circuit boards in a predetermined arrangement.

In another aspect, a backlight module includes an optical plate and an LED light source. The LED light source includes at least one LED module. Each LED module includes at least three circuit boards in parallel, and a plurality of light-mixing units. Each light-mixing unit has two first color LEDs, a second color LED, and a third color LED. The first, second, and third color LEDs of each light-mixing unit are distributed on the at least three circuit boards in a predetermined arrangement.

Other novel features and advantages will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present LED light source and the backlight module using the LED light source. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the light-emitting diode (LED) light source and the backlight module using the light-emitting diode (LED) light source, in detail.

Figure 1:
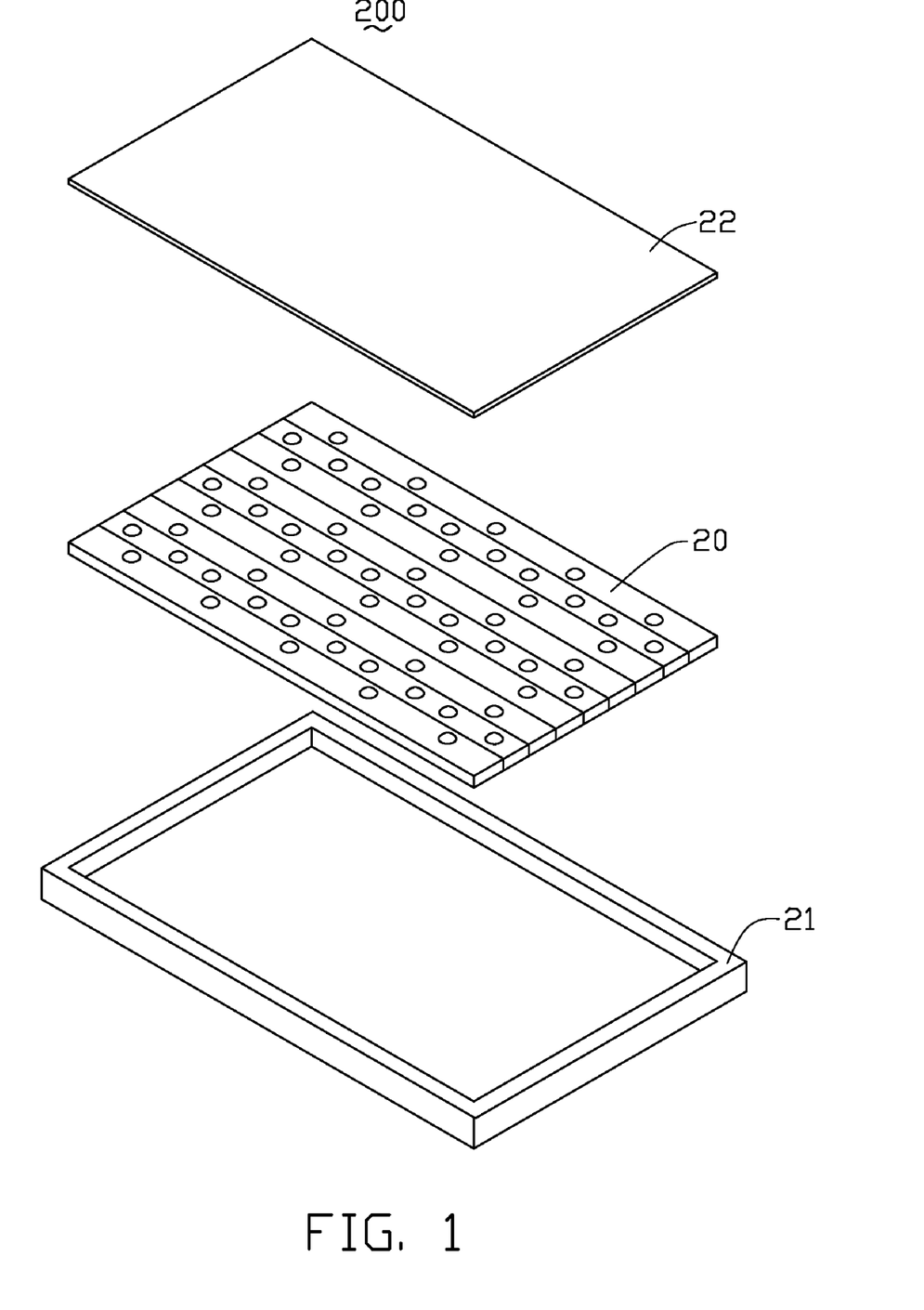
FIG. 1 is an exploded, isometric view of a backlight module according to a first preferred embodiment of the present invention.

Referring to FIG. 1, a backlight module 200 according to a first preferred embodiment of the present invention is shown. The backlight module 1 00 includes a light-emitting diode (LED) light source 20, a frame 21, and an optical plate 22. The frame 21 is used to receive the LED light source 20 and the optical plate 22. The optical plate 22 is positioned over the LED light source 20. Also referring to FIG. 2, the LED light source 20 includes three LED modules 201. Each of the LED modules 201 includes a first circuit board 202, a second circuit board 203, a third circuit board 204, and a plurality of light-mixing units 206. The second circuit board 203 is aligned between and abuts the first circuit board 202 and the third circuit board 204. Each of the light-mixing units 206 has two first color LEDs 2061, a second color LED 2062, and a third color LED 2063. The two first color LEDs 2061 of each light-mixing unit 206 are arranged on the first circuit board 202 and the third circuit board 204 respectively. The second color LED 2062 and the third color LED 2063 of each light-mixing unit 206 are arranged on the second circuit board 203.

Figure 2:
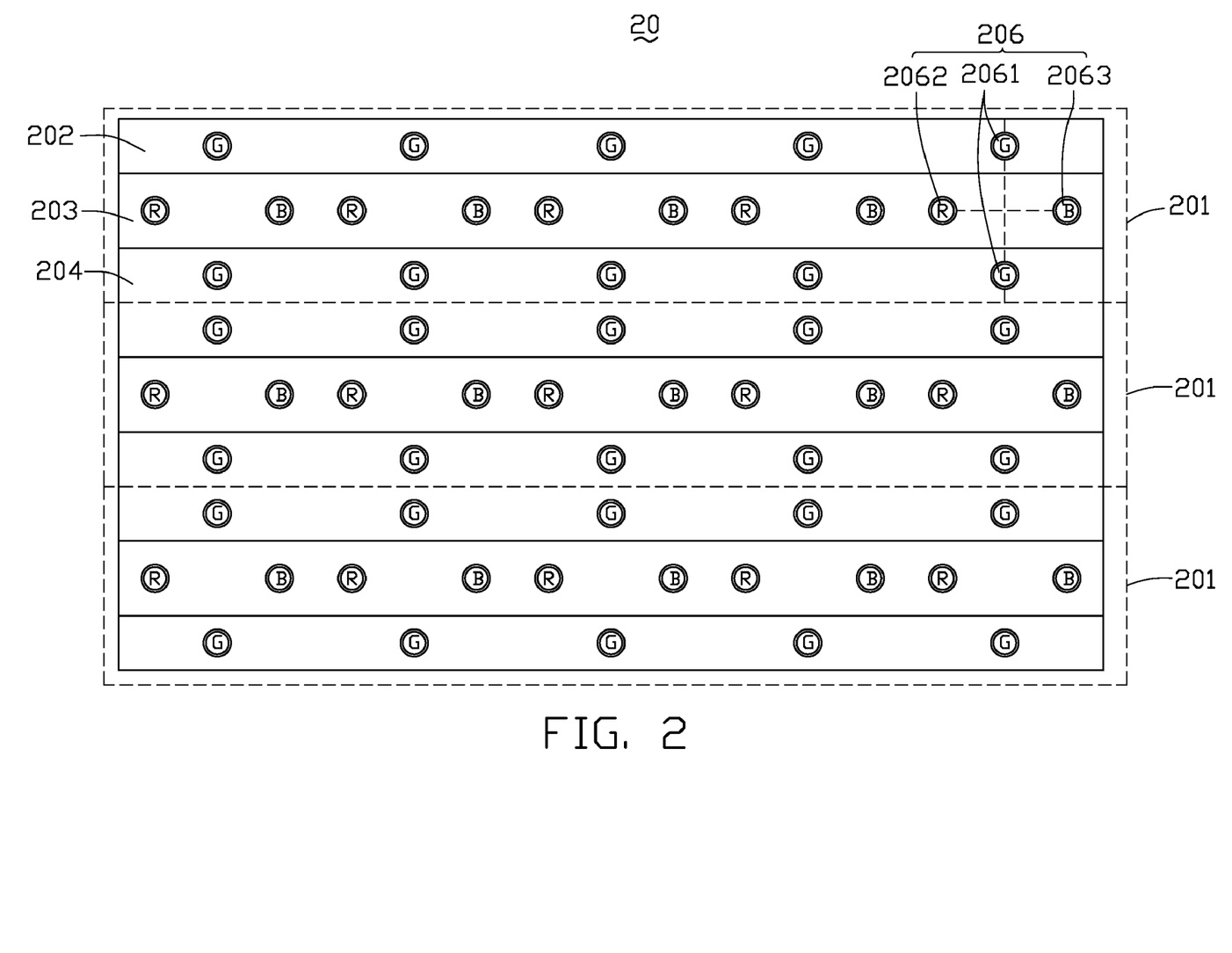
FIG. 2 is an enlarged, top plan view of an LED light source of the backlight module of FIG. 1.

The first, second, and third color LEDs 2061, 2062, and 2063 of each light-mixing unit 206 are distributed on the three circuit boards 202, 203, and 204. Consequently, a distance between any two adjacent of the color LEDs 2061, 2062, and 2063 of light-mixing units 206 can be controlled to be large, and heat generated by the color LEDs 2061, 2062, and 2063 tends to be evenly distributed across the circuit boards 202, 203, and 204. Therefore, overheating at a localized area of the LED light source 10 may be avoided. In addition, each of the circuit boards 202, 203, and 204 has at most two kinds of the color LEDs 2061, 2062, and 2063. Thus arrangement of the first, second and third color LEDs 2061, 2062, and 2063 on the circuit boards 202, 203, and 204 is simplified.

Colors of the first, second, and third color LEDs 2061, 2062, and 2063 correspond to a mixture of colors that is capable of producing a desired color of light emission from the backlight module 200. In the illustrated embodiment, it is desired that white light be emitted from the backlight module 200. Thus, the first color LED 2061 is substantially a green LED, the second color LED 2062 is substantially a red LED, and the third color LED 2063 is substantially a blue LED.

The first, second, and third color LEDs 2061, 2062, and 2063 of each light-mixing unit 206 can be configured to be in the shape of a cross. Put another way, the first, second, and third color LEDs 2061, 2062, and 2063 of each light-mixing unit 206 can be configured to be in the shape of a polygon. The polygon may be one of a triangle and a quadrangle. In order to dissipate the heat generated by the color LEDs 2061, 2062, and 2063, the polygon is preferably a quadrangle, with each LED 2061, 2062, and 2063 occupying a respective corner of the polygon. In the illustrated embodiment, the polygon is substantially a parallelogram, with two diagonals of the polygon intersecting at a right angle. The two first color LEDs 2061 are opposite to each other, and the second color LED 2062 and the third color LED 2063 are opposite to each other.

Each first, second, and third circuit board 202, 203, and 204 is substantially an elongated rectangular plate. A main material of the first, second, and third circuit boards 202, 203 and 204 can be a metallic material, for example aluminum.

Figure 3:
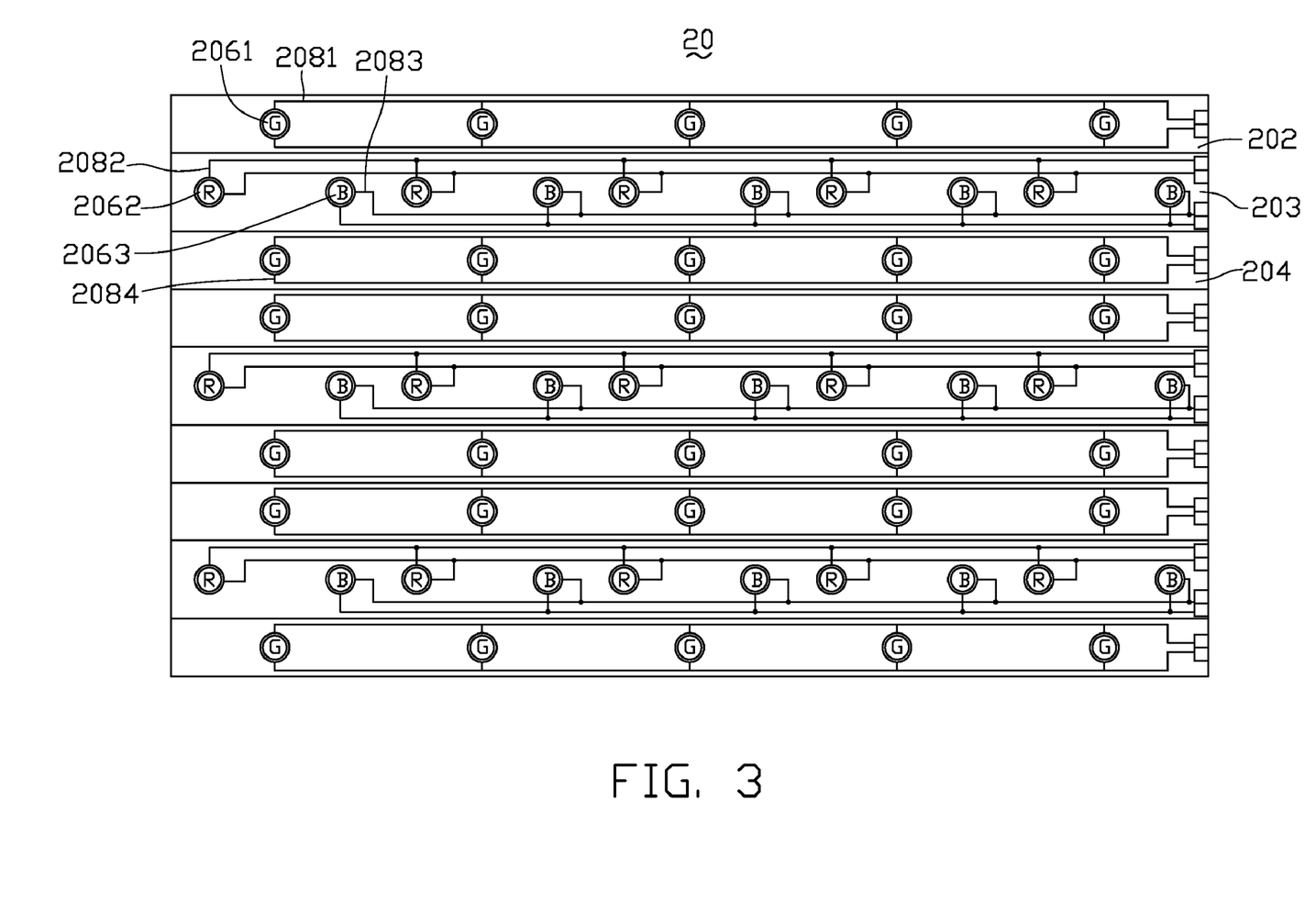
FIG. 3 is similar to FIG. 2, but also showing wire connections of LEDs of the LED light source.

The first, second, and third color LEDs 2061, 2062, and 2063 are electrically connected to the corresponding circuit boards 202, 203, and 204 of each LED module 201. Referring to FIG. 3, in the illustrated embodiment, the first color LEDs 2061 on the first circuit board 202 are electrically connected in parallel by first wires 2081. The first color LEDs 2061 on the third circuit board 204 are electrically connected in parallel by fourth wires 2084. The second color LEDs 2062 and third color LEDs 2063 on the second circuit board 203 are electrically connected in parallel by second wires 2082 and third wires 2083 respectively. Accordingly, the first color LEDs 2061 on the first circuit board 202, the first color LEDs 2061 on the third circuit board 204, the second color LEDs 2062 on the second circuit board 203, and the third color LEDs 2063 on the second circuit board 203 are electrically connected in parallel. Therefore the backlight module 200 can control the first color LEDs 2061, the second color LEDs 2062, and the third color LEDs 2063 to emit light as required, and thereby change the color of the mixed light emitted from the backlight module 200. Consequently, the backlight module 200 can easily achieve a desired color.

Figure 4:
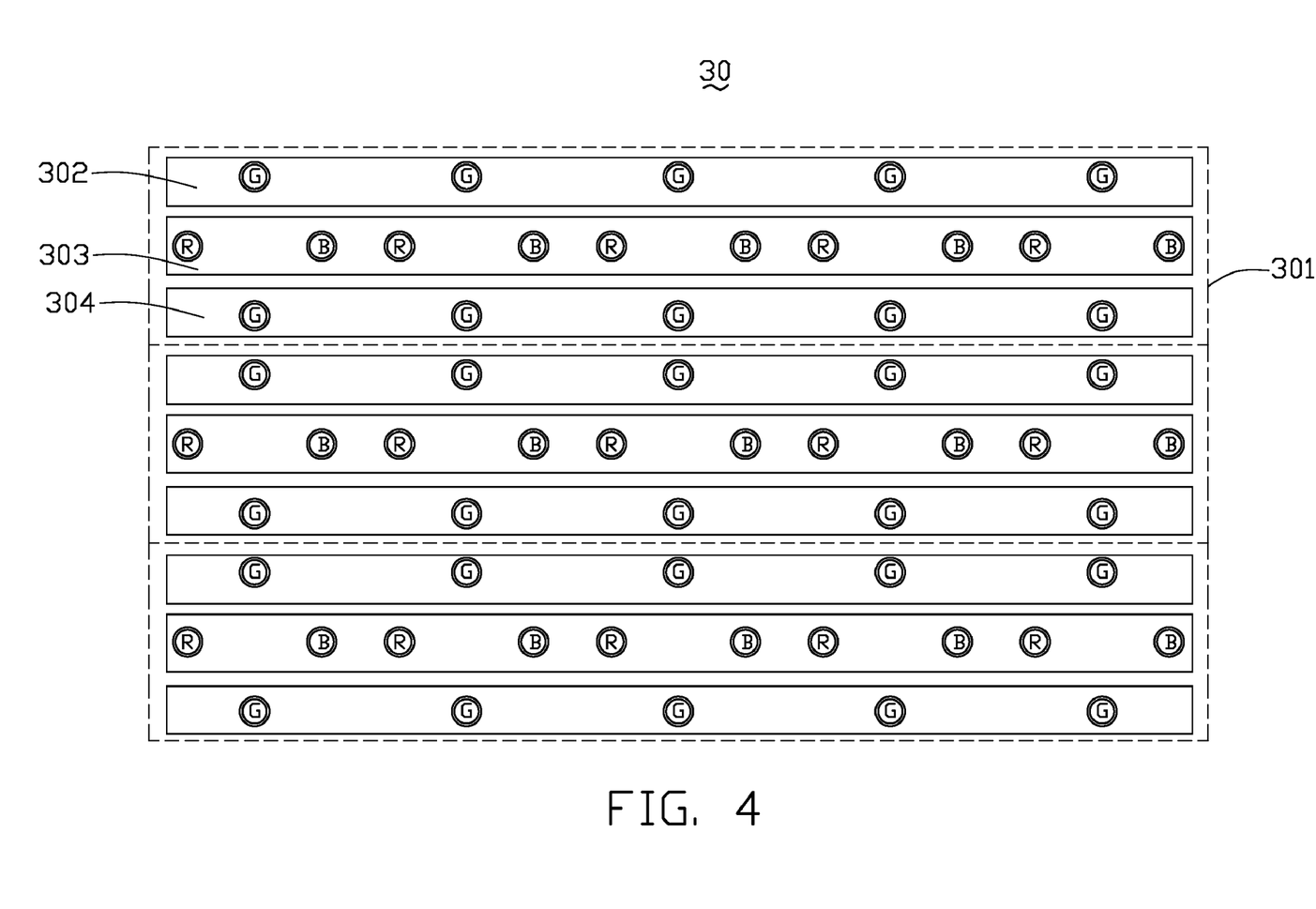
FIG. 4 is a top plan view of an LED light source of a backlight module according to a second preferred embodiment of the present invention.

Referring to FIG. 4, an LED light source 30 of a backlight module according to a second preferred embodiment of the present invention is shown. The backlight module is similar in principle to the backlight module 200 described above. The LED light source 30 includes three LEDs modules 301. Each LED module 301 includes a first circuit board 302, a second circuit board 303, and a third circuit board 304. The first, second, and third circuit boards 302, 303, and 304 are disposed parallel to but spaced apart from one another. Since the first, second, and third circuit boards 302, 303, and 304 have spaces between them, the amount of material needed to construct the circuit boards 302, 303, and 304 can be reduced.

Figure 5:
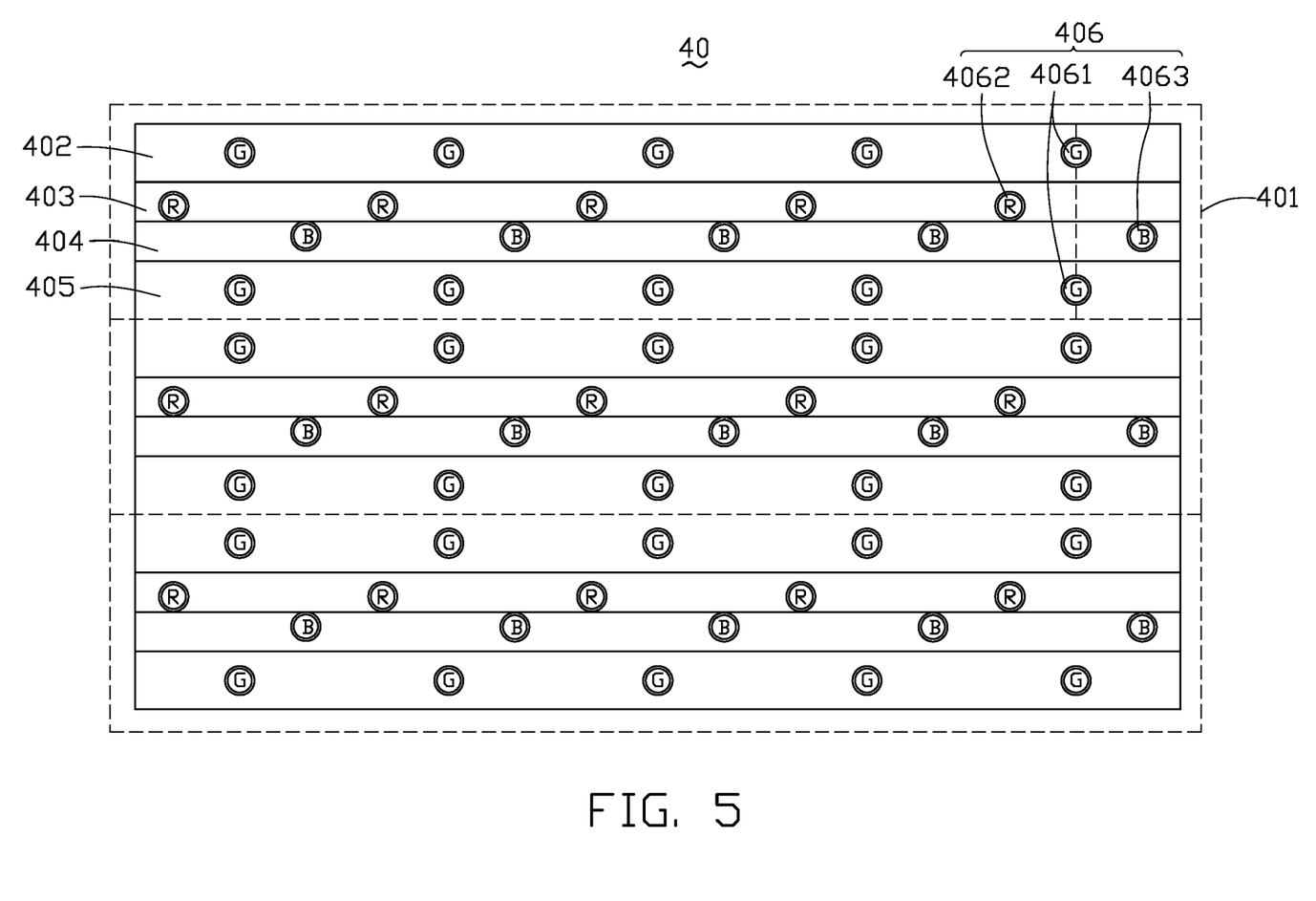
FIG. 5 is a top plan view of an LED light source of a backlight module according to a third preferred embodiment of the present invention.

Referring to FIG. 5, an LED light source 40 of a backlight module according to a third preferred embodiment of the present invention is shown. The backlight module is similar in principle to the backlight module 200 described above. The LED light source 40 includes three LED modules 401. Each LED module 401 includes a first circuit board 402, a second circuit board 403, a third circuit board 404, a fourth circuit board 405, and a plurality of light-mixing units 406. Two first color LEDs 4061 of each light-mixing unit 406 are arranged on the first circuit board 402 and the fourth circuit board 405 respectively. A second color LED 4062 and a third color LED 4063 of each light-mixing unit 406 are arranged on the second circuit board 403 and the third circuit board 404 respectively. Each of the first, second, third, and fourth circuit boards 402, 403, 404, and 405 has just one kind of color LED 4061, 4062, and 4063. Thus the first, second, and third color LEDs 4061, 4062, and 4063 may be more easily arranged on the circuit boards 402, 403, 404, and 405.

Figure 6:
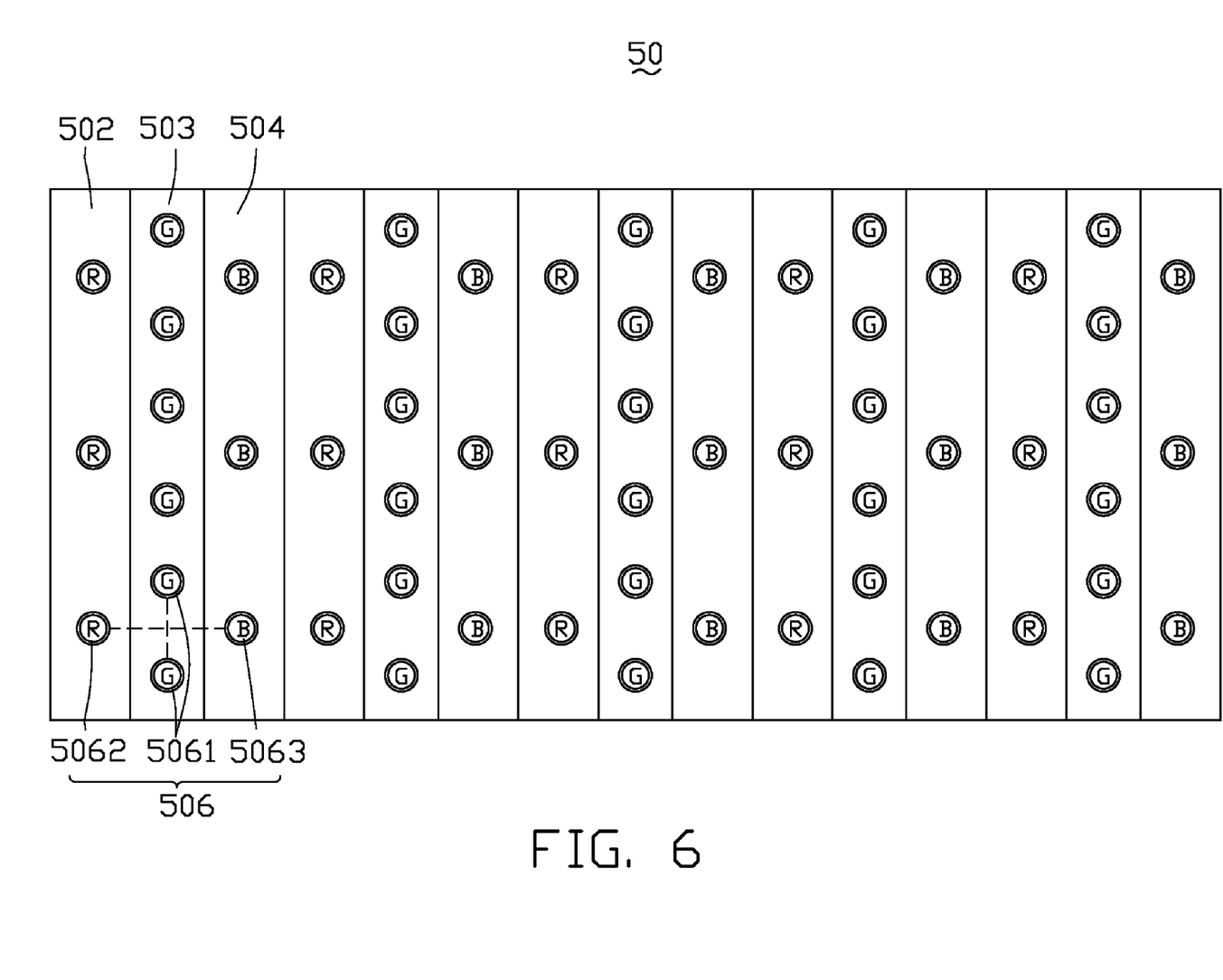
FIG. 6 is a top plan view of an LED light source of a backlight module according to a fourth preferred embodiment of the present invention.

Referring to FIG. 6, an LED light source 50 of a backlight module according to a fourth preferred embodiment of the present invention is shown. The backlight module is similar in principle to the backlight module 200 described above. The LED light source 50 includes five LED modules (not labeled). Each LED module includes a first circuit board 502, a second circuit board 503, a third circuit board 504, and a plurality of light-mixing units 506. Two first color LEDs 5061, a second color LED 5062, and a third color LED 5063 of each light-mixing unit 506 are arranged on the second circuit board 503, the first circuit board 502, and the third circuit board 504 respectively.

In addition, the inventive LED light source and backlight module using the LED light source are not limited to the embodiments described above. For example, there can be one, two, four, or more than four of the LED modules 201, 301, 401, and 501. In another example, the first, second, third, and fourth circuit boards 402, 403, 404, and 405 can also disposed spaced apart from one another.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A light emitting diode (LED) light source comprising:
at least one LED module, each LED module including:
at least three separated circuit boards disposed in parallel; and a plurality of light-mixing units, wherein each of the light-mixing units comprises two first color LEDs, a second color LED, and a third color LED; the first, second, and third color LEDs of each of the light-mixing units are distributed on the at least three separated circuit boards in the shape of a quadrangle, and each of the first, second, and third color LEDs occupies a respective corner of the quadrangle.

2. The LED light source according to claim 1, wherein a shape of each of the at least three circuit boards is an elongated rectangular plate.

3. The LED light source according to claim 1, wherein the at least three circuit boards comprise a first circuit board, a second circuit board, and a third circuit board, the second circuit board is aligned between the first circuit board and the third circuit board; the two first color LEDs of each light-mixing unit are arranged on the first circuit board and the third circuit board respectively, and the second color LED and the third color LED of each light-mixing unit are arranged on the second circuit board.

4. The LED light source according to claim 1, wherein the at least three circuit boards are four circuit boards, the two first color LEDs of each light-mixing unit are arranged on two of the four circuit boards, and the second color LED and the third color LED of each light-mixing unit are arranged on the other two of the four circuit boards respectively.

5. The LED light source according to claim 1, wherein the at least three circuit boards comprise a first circuit board, a second circuit board, and a third circuit board, the second circuit board is aligned between the first circuit board and the third circuit board, the two first color LEDs of each light-mixing unit are arranged on the second circuit board, and the second color LED and the third color LED of each light-mixing unit are arranged on the first circuit board and the third circuit board respectively.

6. The LED light source according to claim 1, wherein the two first color LEDs, the second color LED, and the third color LED of each light-mixing unit are configured in the shape of a parallelogram.

7. The LED light source according to claim 1, wherein each of the first color LEDs is a green LED, the second color LED is a red LED, and the third color LED is a blue LED.

8. The LED light source according to claim 1, wherein the first color LEDs of each of one or more of the at least three circuit boards are connected in parallel, the second color LEDs of one of the at least three circuit boards are connected in parallel, and the third color LEDs of one of the at least three circuit boards are connected in parallel.

9. A backlight module comprising:
an optical plate; and
at least a light emitting diode (LED) module adjacent the optical plate, each LED module including:
at least three separated circuit boards disposed in parallel; and
a plurality of light-mixing units, wherein each of the light-mixing units comprises two first color LEDs, a second color LED, and a third color LED; the first, second, and third color LEDs of each of the light-mixing units are distributed on the at least three separated circuit boards in the shape of a quadrangle, and each of the first, second, and third color LEDs occupies a respective corner of the quadrangle.

10. The backlight module according to claim 9, wherein a shape of each of the at least three circuit boards is an elongated rectangular plate.

11. The backlight module according to claim 9, wherein the at least three circuit boards comprise a first circuit board, a second circuit board, and a third circuit board, the second circuit board is aligned between the first circuit board and third circuit board, the two first color LEDs of each light-mixing unit are arranged on the first circuit board and the third circuit board respectively, and the second color LED and the third color LED of each light-mixing unit are arranged on the second circuit board.

12. The backlight module according to claim 9, wherein the at least three circuit boards are four circuit boards, the two first color LEDs of each light-mixing unit are arranged on two of the four circuit boards, and the second color LED and the third color LED of each light-mixing unit are arranged on the other two of the four circuit boards respectively.

13. The backlight module according to claim 9, wherein the at least three circuit boards comprise a first circuit board, a second circuit board, and a third circuit board, the second circuit board is aligned between the first circuit board and the third circuit board, the two first color LEDs of each light-mixing unit are arranged on the second circuit board, and the second color LED and the third color LED of each light-mixing unit are arranged on the first circuit board and the third circuit board respectively.

14. The backlight module according to claim 9, wherein the two first color LEDs, the second color LED, and the third color LED of each light-mixing unit are configured in the shape of a parallelogram.

15. The backlight module according to claim 9, wherein each of the first color LEDs is a green LED, the second color LED is a red LED, and the third color LED is a blue LED.

* * * * *